Patented Oct. 10, 1933

1,930,095

UNITED STATES PATENT OFFICE 1,930,095

POTTERY PRODUCT

Max Hauser, Wallisellen, near Zurich, Switzerland

No Drawing. Original application April 13, 1927, Serial No. 183,618, and in Switzerland April 28, 1926. Divided and this application May 27, 1930. Serial No. 456,303

3 Claims. (Cl. 106—11)

This invention relates to ceramic products and constitutes a division of an application on Shaped metal containing bodies and methods of production thereof, filed April 13, 1927 and bearing Serial No. 183,618 on which was granted Patent 1,790,918 on Feb. 3, 1931.

Ceramic products, such as porcelain, stoneware and pottery are employed for a variety of purposes in industry and in the household. In chemical works, stoneware find extensive employment on account of its resistance to acids. A disadvantage of this material chiefly consists in its small thermal conductivity and its sensitivity to rapid temperature changes, i. e.; it cracks when rapidly heated and cannot consequently be brought into contact with hot liquids or gases. The present invention accordingly provides a ceramic material having improved mechanical, thermal and chemical properties, and more particularly to such a material having high thermal conductivity and high resistance to temperature changes.

The invention also consists in forming a product having the general characteristics, the new and useful applications and the several original features of a utility hereinafter set forth and claimed.

The improved product in accordance with the present invention consists of ceramic material and silicon alloy especially ferrosilicon, and is obtained by mixing raw ceramic masses preferably of the silicate type with silicon alloy, for instance, ferrosilicon, the material being shaped and fired in the usual way. Ceramic raw material such as clay, kaolin, steatite, feldspar and quartz which are usually combined together in the nature of ceramic masses may be employed. Additions of materials containing boric acid or borate may be desirable under certain conditions.

In preparing the improved product, the ceramic mass is mixed with silicon alloy or ferrosilicon, in powdered or granular form and the required product obtained from the mixture by shaping same in a plastic state or by pressing or casting in paste form. The plasticity of the mixture may, if necessary, be increased by adhesives such as glucose, starch, tragacanth and the like. The firing process is carried out in a manner customary in the ceramic industry. The temperature of firing will depend upon the composition of the material to be fired. This temperature, however, is preferably below the fusion temperature of silicon.

For preparing acid resisting ceramic products, it is advantageous to employ nearly pure silicon or ferrosilicon with 90 to 95% silicon. Metallic compositions having high silicon contents possess acid resisting properties as well as high resistance to oxidations and mixed with the ceramic mass, they do not give rise to disturbing oxidation phenomena on firing. When silicon alloy having a low content of silicon is employed, oxidation phenomena may be avoided by employing an easily sintered clay for the mixture or by adding fluxes such as boric acid or borate which bring about the sintering at correspondingly lower temperature.

There are no limits to the mixing proportions of silicon alloy and ceramic material. It is thus possible to prepare useful products which consist chiefly of silicon and which only contain a small admixture of ceramic material such as a product consisting of 90% silicon or ferrosilicon and 10% ceramic material. For the production of such articles having a high percentage of metallic components, it is advantageous to employ an admixture of easily fusible compounds of fluxes, more particularly of materials containing boric acid or borate, if a nonporous product is to be obtained. Other specific products which are herein set forth as a possible concrete embodiment of the present invention, may consist of the following proportions under the stated physical conditions:

I. 30 parts by weight of finely ground silicon alloy (for instance ferrosilicon with 90 to 65% silicon).
70 parts by weight of clay;

or:

II. 30 parts by weight of finely ground silicon alloy,
30 parts by weight of silicon alloy, coarse grain,
30 parts by weight of clay,
10 parts by weight of a flux, consisting chiefly of borates.

What I wish to claim and secure by the U. S. Letters Patent, is:—

1. A container having acid resisting properties, high thermal conductivity and high resistance to breaking during temperature changes, the container walls comprising a fired mixture of discrete particles of finely ground or granular silicon bonded together by a matrix of ceramic raw material of the silicate type.

2. A container having acid resisting properties, high thermal conductivity and high resistance to breaking during temperature changes, the container walls comprising a fired mixture of discrete particles of finely ground or granular silicon alloy bonded together by a matrix of ceramic raw material of the silicate type.

3. A container having acid resisting properties, high thermal conductivity and high resistance to breaking during temperature changes, the container walls comprising a fired mixture of discrete particles of finely ground or granular ferrosilicon containing over 90% of silicon bonded together by a matrix of ceramic raw material of the silicate type.

MAX HAUSER.